(12) United States Patent
Murray

(10) Patent No.: US 9,461,449 B2
(45) Date of Patent: Oct. 4, 2016

(54) COVERING FOR ELECTRICAL CORD

(71) Applicant: Jeffrey Murray, Laguna Beach, CA (US)

(72) Inventor: Jeffrey Murray, Laguna Beach, CA (US)

( * ) Notice: Subject to any disclaimer, the term of this patent is extended or adjusted under 35 U.S.C. 154(b) by 0 days.

(21) Appl. No.: 14/643,949

(22) Filed: Mar. 10, 2015

(65) Prior Publication Data

US 2015/0311685 A1    Oct. 29, 2015

Related U.S. Application Data

(60) Provisional application No. 61/992,076, filed on May 12, 2014, provisional application No. 61/951,372, filed on Mar. 11, 2014.

(51) Int. Cl.
*H02G 3/04* (2006.01)

(52) U.S. Cl.
CPC .................................. *H02G 3/0487* (2013.01)

(58) Field of Classification Search
CPC .......... H02G 3/22; H02G 3/26; H02G 3/283; H02G 3/285; H02G 3/30; H02G 3/34; H02G 3/36; H02G 3/383; H02G 3/40; H02G 3/0487; H02G 3/04; H02G 3/0437
USPC .......... 174/68.3, 68.1, 72 A, 88 R, 96, 70 C, 174/481, 482, 36, 135, 136, 110 R; 248/49, 248/68.1
See application file for complete search history.

(56) References Cited

U.S. PATENT DOCUMENTS

| | | | | |
|---|---|---|---|---|
| 5,397,243 A * | 3/1995 | MacMurdo, Sr. | ..... | H02G 11/00 174/135 |
| 6,018,874 A * | 2/2000 | Todd | ...................... | A01G 3/053 174/136 |
| 6,740,818 B2 * | 5/2004 | Clark | ................... | H02G 3/0481 174/135 |
| 6,854,990 B2 * | 2/2005 | Harrell | ................ | H02G 3/0468 439/135 |
| 6,916,992 B1 * | 7/2005 | Ortiz | ...................... | H02G 1/081 174/72 A |
| 7,119,279 B2 * | 10/2006 | Niehaus | ............... | H02G 3/0487 174/72 A |
| 7,202,414 B2 * | 4/2007 | Johnson | ................... | H01B 7/06 174/36 |
| 7,355,119 B2 * | 4/2008 | Katz | .................... | H02G 3/0475 174/72 A |
| 7,622,670 B1 * | 11/2009 | Sanderson | ............. | H02G 11/00 174/36 |
| 7,807,928 B1 * | 10/2010 | Tate | ..................... | H02G 3/0487 174/110 R |
| 8,383,941 B2 * | 2/2013 | Goodman | ............ | H04R 1/1033 174/68.3 |
| 8,399,769 B2 * | 3/2013 | Doll | ..................... | H04R 1/1033 174/110 R |

* cited by examiner

*Primary Examiner* — Angel R Estrada
(74) *Attorney, Agent, or Firm* — One LLP

(57) ABSTRACT

An electric cord covering for protecting surrounding surfaces from damage by the electrical cord, comprising: a flexible tube defining interior and exterior surfaces; a proximal edge and an opposing distal edge joining the interior and exterior surfaces, each edge defining an opening; an interior space defined by the interior surface operable to receive at least one electrical cord at least partially therein such that the received cord is housed within the flexible tube; and at least one structural support for promoting the traversal of the electrical cord within the flexible tube.

20 Claims, 9 Drawing Sheets

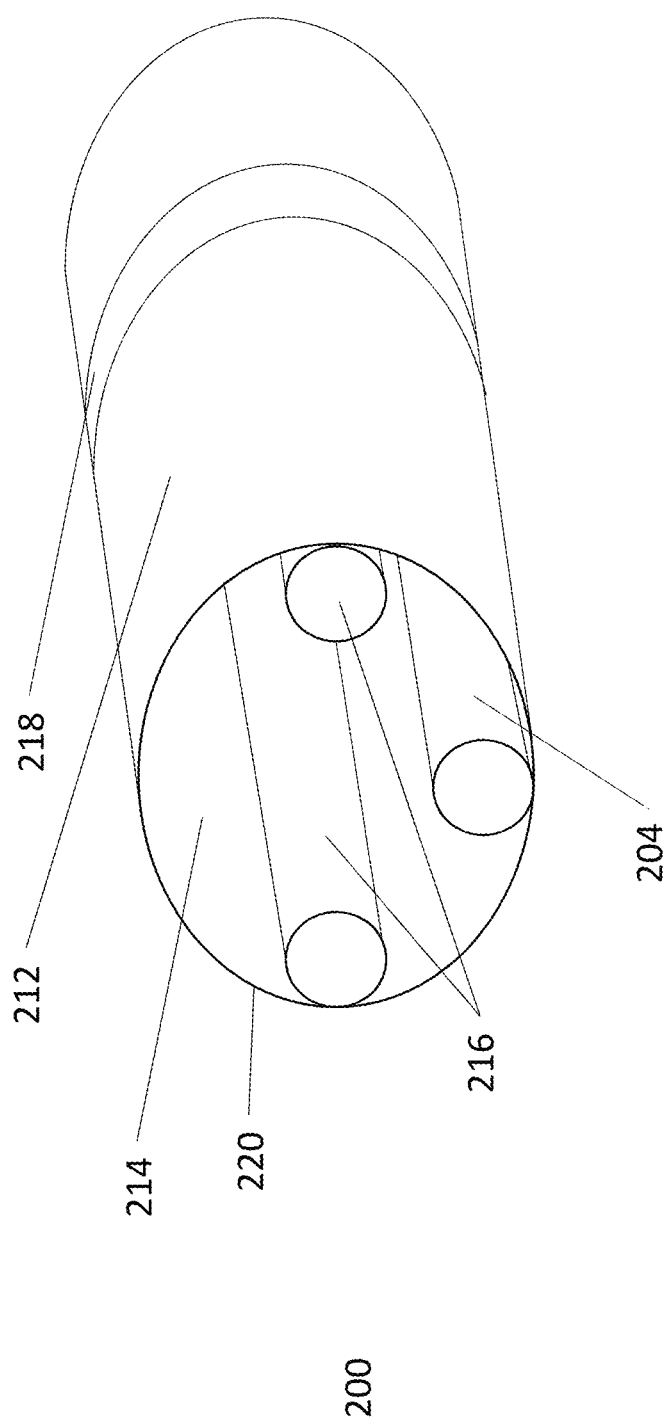

COVERING FOR ELECTRICAL CORD

CROSS-REFERENCE TO RELATED APPLICATIONS

This application is based on U.S. Provisional Application No. 61/951,372, filed on Mar. 11, 2014, and U.S. Provisional Application No. 61/992,076, filed on May 12, 2014, the entire contents and disclosures of which are herein incorporated by reference.

BACKGROUND OF THE INVENTION

The subject matter described herein relates generally to a system, device, and method for covering an electrical cord.

Every year millions of homes, offices, restaurants, retail stores, factories, shipping centers and other establishments and businesses in the Unites States and abroad suffer hundreds of millions of dollars in damages, due to electrical cords, including extension cords rubbing and hitting against walls, furniture and other property. In particular, electrical cords are commonly fixed at one end to the electrical outlet (or other power source) and at the other end to an electric powered apparatus—for example, a vacuum cleaner—that is moved about a room or other areas containing damageable items such as, e.g., furniture, walls and wall corners. Oftentimes, on movement of the electrical apparatus, an uncovered electrical cord will contact the damageable item and cause damage to it. For example, when vacuuming a room, the vacuum cleaner cord will often rub against wall corners damaging them.

Numerous cleaning companies are fired for causing damage to walls, baseboards, furniture, appliances, railings, posts, decks, siding, and other items and structures. This can tarnish otherwise clean reputations because the employer who hired the cleaning company can consider them to be a low quality company for causing damage. Businesses and homeowners have few options which allow them to use appliances without causing this type of unnecessary damage other than being extraordinarily careful—which leads to decreased speed and efficiency.

It is therefore desirable to provide a system, device and method for covering electrical cords that overcomes the deficiencies noted above.

SUMMARY OF THE INVENTION

Briefly, and in general terms, the embodiments of the present invention described herein provide for a system, device and method for covering electrical cords so as to inhibit damage by the electrical cord to its surroundings. Provided herein are embodiments of a device, system, and method of covering electrical cords of electrical apparatuses of the construction, hospitality, residential, commercial, and/or other industries where a user wishes to protect the surrounding structures (e.g., walls, furniture, baseboards, door casings) objects and/or surfaces from damage.

These and other features, aspects and advantages of the present invention will be apparent from the following more detailed description, taken in conjunction with the accompanying drawings, which illustrate, by way of example, the principles of the present invention.

BRIEF DESCRIPTION OF THE SEVERAL VIEWS OF THE DRAWING(S)

Illustrated in the accompanying drawing(s) is at least one of the best mode embodiments of the present invention. In such drawing(s):

FIG. 2A shows an example cross section of an electrical cord cover according to at least one embodiment of the present invention.

DETAILED DESCRIPTION OF THE PREFERRED EMBODIMENTS

Figure 1A:
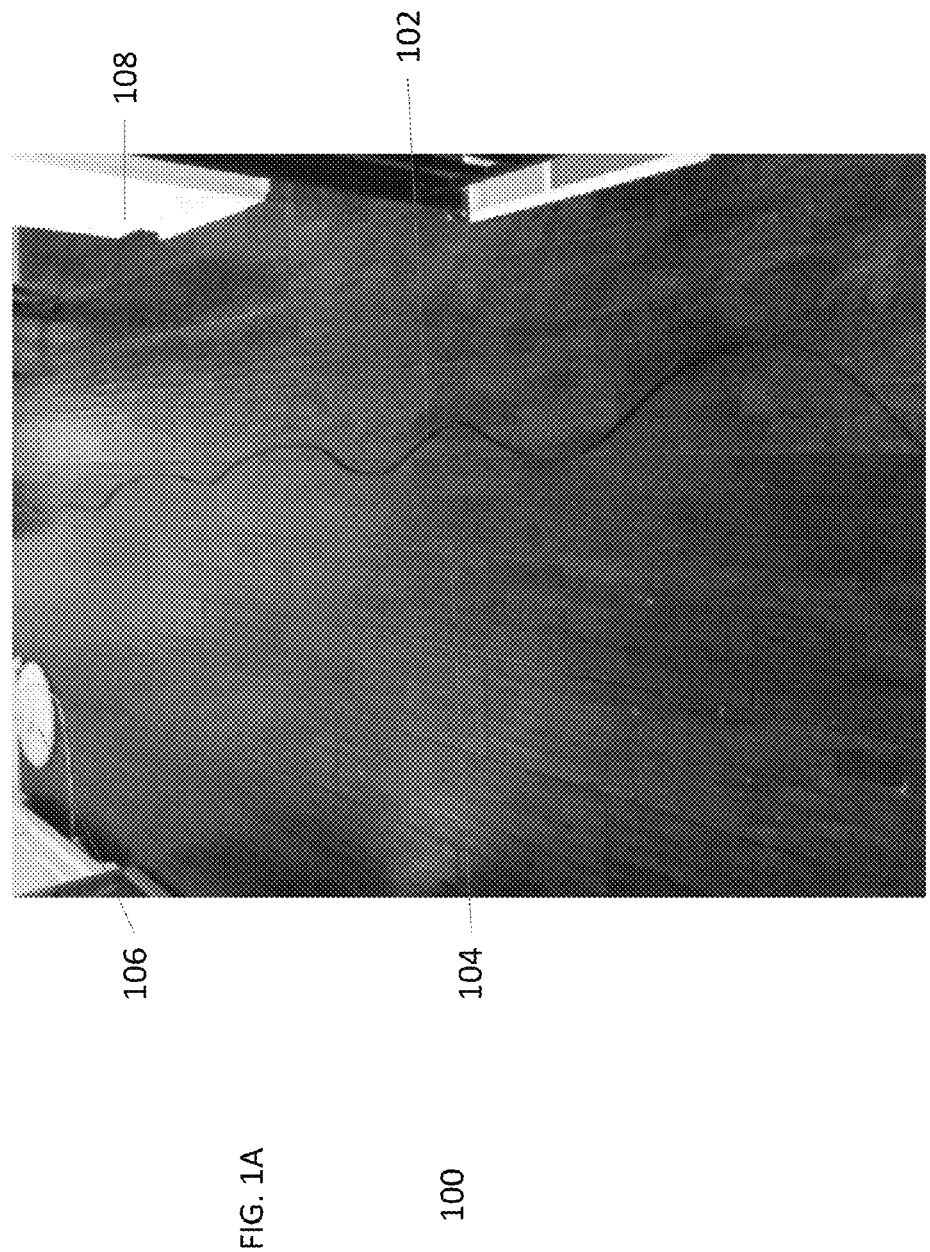
FIG. 1A shows an example embodiment of a typical home environment.

The above described drawing figures illustrate the described invention and method of use in at least one of its preferred, best mode embodiment, which is further defined in detail in the following description. Those having ordinary skill in the art may be able to make alterations and modifications to what is described herein without departing from its spirit and scope. While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated. All features, elements, components, functions, and steps described with respect to any embodiment provided herein are intended to be freely combinable and substitutable with those from any other embodiment unless otherwise stated. Therefore, it should be understood that what is illustrated is set forth only for the purposes of example and should not be taken as a limitation on the scope of the present invention.

Described now in detail is a system, method and device for covering electrical cords so as to substantially inhibit damage to surrounding structures.

FIG. 1A shows an exemplary home environment 100 in which at least one embodiment of the instant invention is utilized. In FIG. 1A, an electrical cord 102 is seen laying across a floor 104 near an appliance 106 and wall 108. The electrical cord 102 may be attachable permanently or detachably to an electrical appliance such as, for example, residential vacuum cleaners, shop vacuum cleaners, de-humidifiers, air movers, portable extractors, carpet washers, floor buffers, or other cleaning appliances. Additionally or alternatively, electrical cords can be attached to other electrical appliances which are moved less frequently or more sporadically such as guitar amplifiers, telephone chargers, power strips, computer power cords, speaker cords or other electrical appliances or devices. Alternatively or additionally, electrical cord 102 can be any electrical cord that could cause damage to property with contact.

Figure 1B:
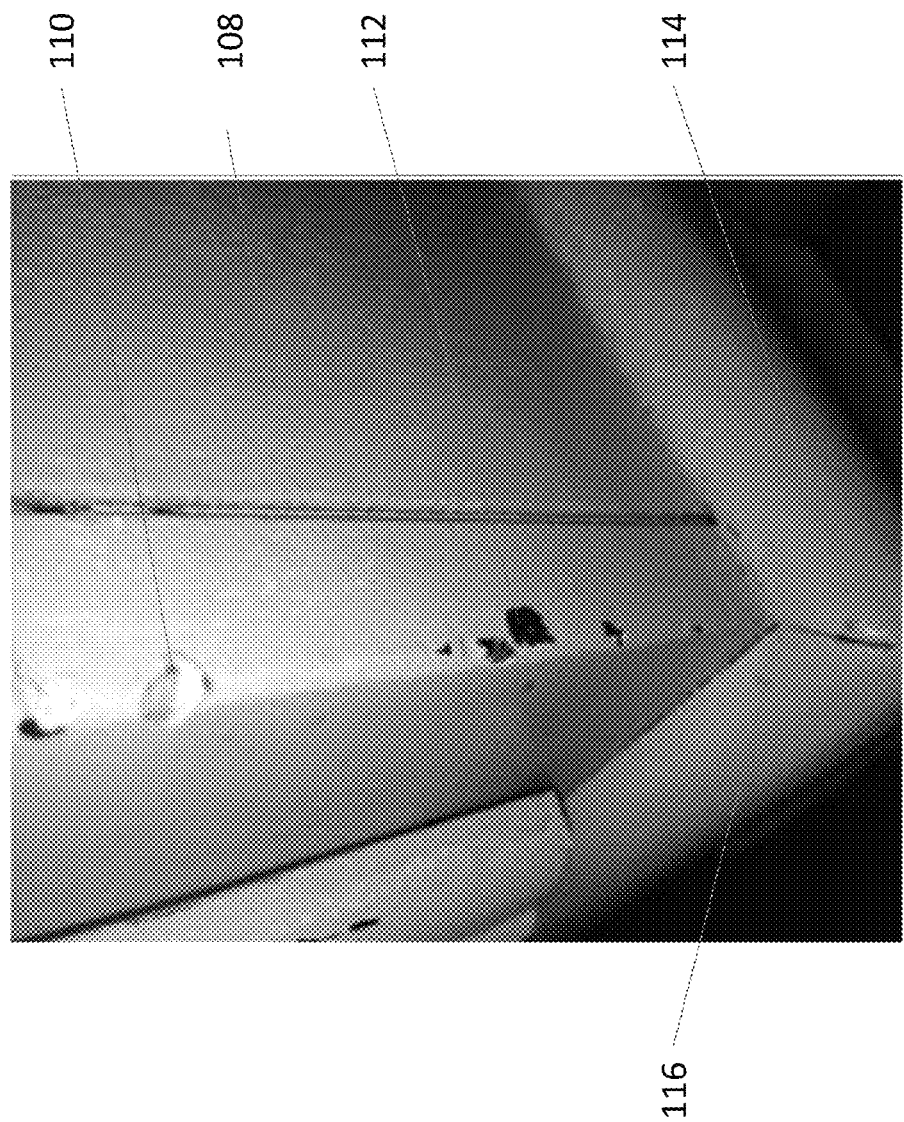
FIG. 1B shows an example embodiment of a wall corner which has been damaged by electrical cords.

FIG. 1B shows an exemplary wall 108 with a corner that has been damaged by the electrical cord. In the example embodiment dents 110, paint chipping 112, scuffing 114, discoloration 116 and other types of damage can be caused by rubbing, hitting or other damaging contact between elongate members and walls, appliances and baseboards through normal or excessive force.

FIG. 2A shows a cross sectional view 200 of a cord cover 212 according to at least one embodiment of the present invention. The cord cover 212 comprises: a flexible tube 230 defining interior 226 and exterior 224 surfaces; a plurality of edges 220 joining the interior 226 and exterior 224 surfaces, each edge 220 defining an opening; and an interior space 214 defined by the interior surface. The interior space 214 is operable to receive at least one cord 204 at least partially therein such that the received cord is housed within the flexible tube 230.

The cord cover may further include one or more rigid or semi-rigid structural supports 216/218 adjacent one or more of the interior and/or exterior surfaces. In operation, the structural supports may function to maintain the interior space in a substantially open configuration, or otherwise promote traversal within the flexible tube by the electrical cord.

The structural supports may include at least one longitudinal support 216. The longitudinal support may extend longitudinally along the partial or complete length of the flexible tube. FIG. 2A shows two longitudinal supports 216.

The structural supports may include at least one circumferential support 218. The circumferential support may extend circumferentially about the partial or complete circumference of the flexible tube. In some embodiments, the circumferential support 218 is an internal rib disposed adjacent the internal surface, which maintains a minimum area of the interior space 214. In some embodiments, the circumferential supports 218 are disposed at regular and/or irregular intervals along a length of the flexible tube. In at least one embodiment, the circumferential supports are disposed at least adjacent the edges of the flexible tube.

In at least one embodiment, the structural supports include supports that are helical in shape, or that are otherwise configured so as to combine the features of longitudinal and circumferential supports. In some embodiments, at least one longitudinal support is integral to at least one circumferential support. In some embodiments, at least one longitudinal support is removably coupled to at least one circumferential support.

Cord cover 212 can be defined in part by a single walled cloth covering or by a multi walled cloth covering where one wall can be an exterior wall and a second wall can be an interior wall separating opening 214 from structural supports 216/218.

Figure 2B:
FIG. 2B shows an example electrical cord cover in use with an electrical cord according to at least one embodiment of the present invention.

FIG. 2B shows an example embodiment of a cord cover 212 surrounding a cord (hidden from view) with attachment to an electrical plug 206. In the example embodiment cord cover 212 is installed over a cord (hidden from view) up to an electrical plug 206. A transitional area 210 ends in a distal end 208. A proximal end (not shown) can be similar, identical or different from distal end in structure in various embodiments. Distal end 208 can include a location preservation component which allows distal end 208 to maintain a location without slipping, sliding, or otherwise moving from a desired location, such as surrounding a portion of electrical plug 206. In some embodiments, the location preservation component may comprise one or more of: an elastic band, a tie, a drawstring, Velcro, a friction surface, or the like.

Figure 2C:
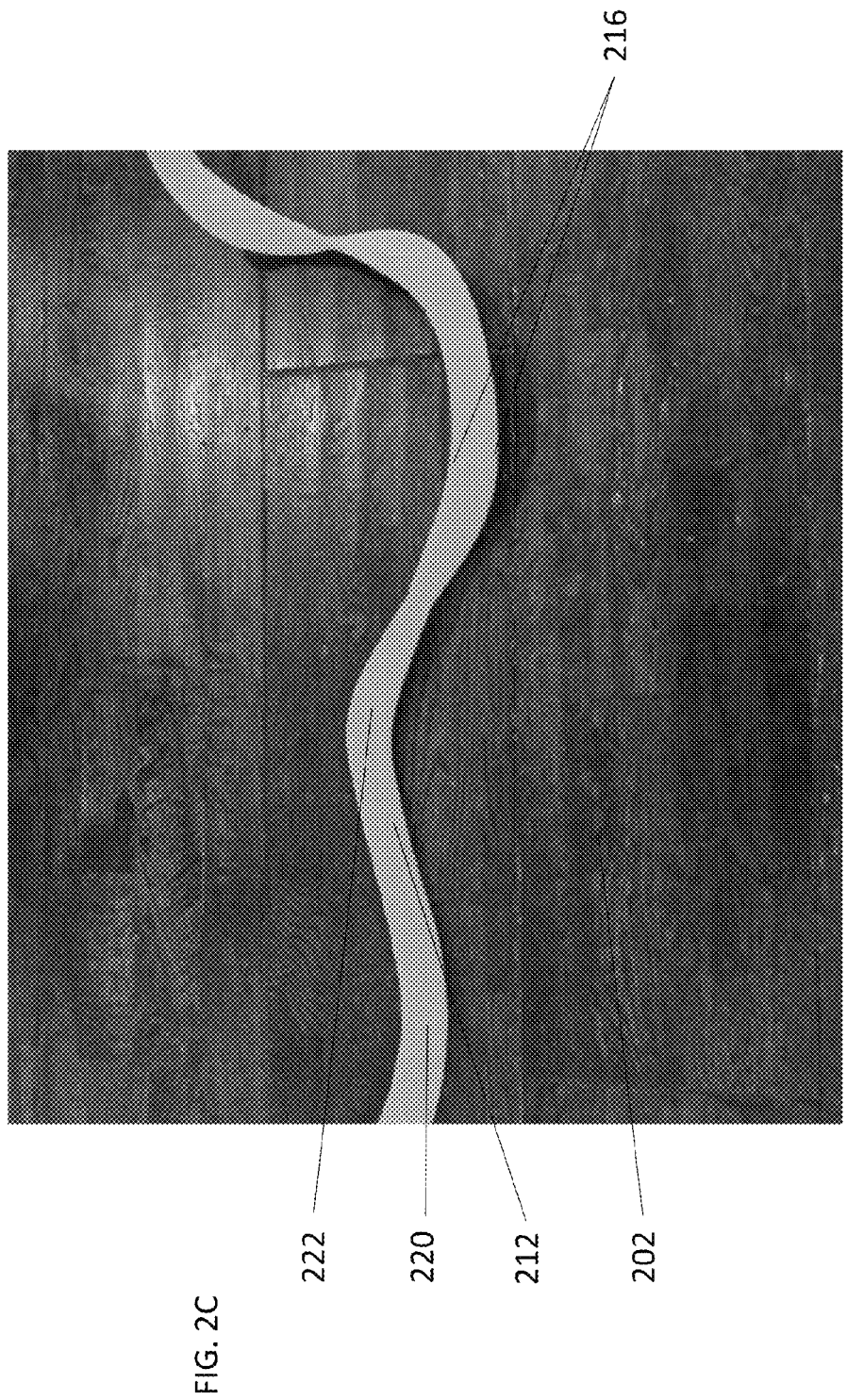
FIG. 2C shows an example electrical cord cover in use with an electrical cord according to at least one embodiment of the present invention.

FIG. 2C shows an example embodiment of a cord cover surrounding a cord. Cord cover 212 can be constructed of soft cotton, hemp or other textile product, foam, flexible Styrofoam, soft rubber or other materials in various embodiments. The material chosen can be use specific and should be resilient enough to be used many times without tearing, ripping, or otherwise becoming damaged through normal use. Some machines have automatic rewinding units for attached electrical cords and cord cover 212 can be fully operational with such units and will do little or nothing to impede their normal operation.

Figure 2D:
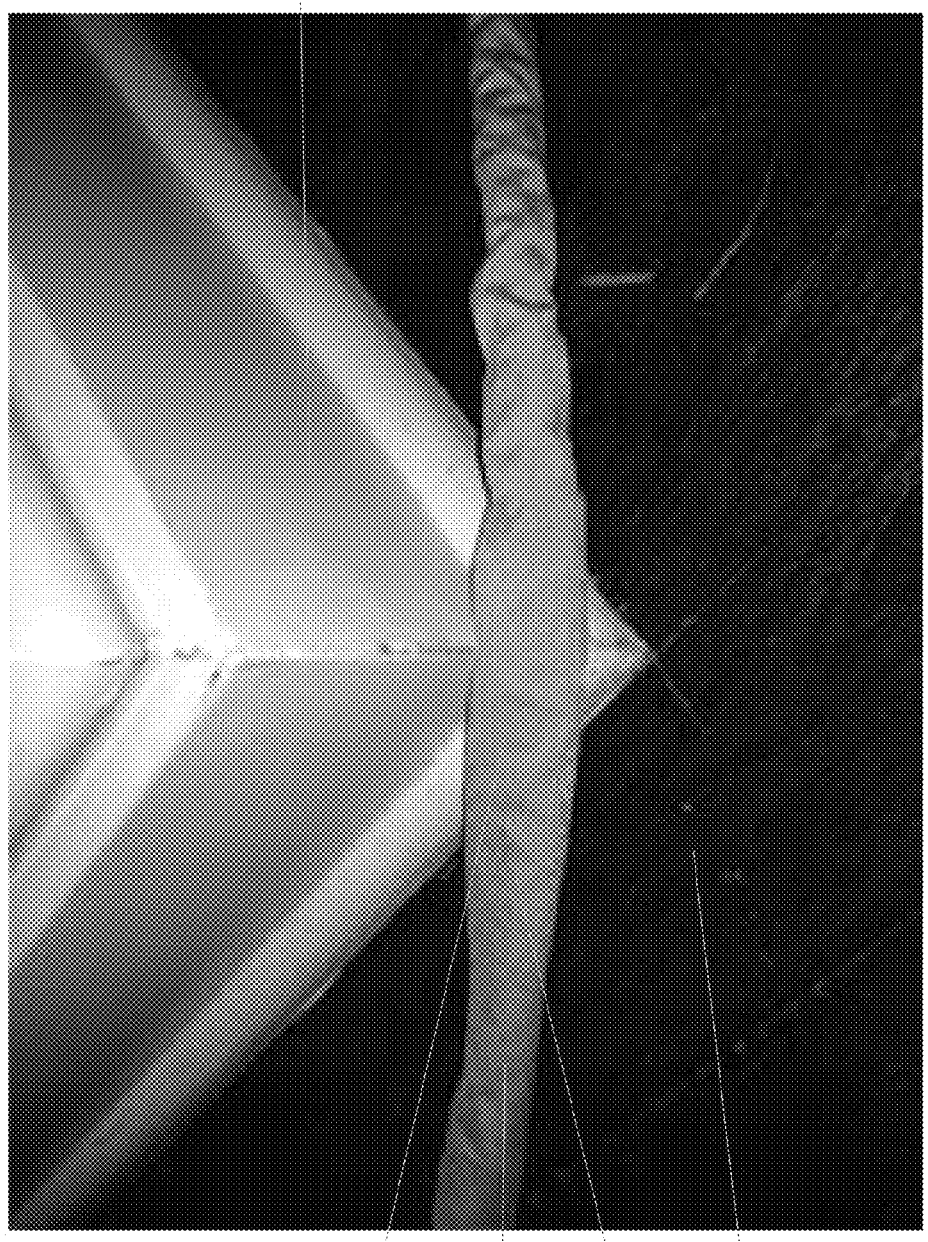
FIG. 2D shows an example electrical cord cover in use with an electrical cord according to at least one embodiment of the present invention.

FIG. 2D shows an example embodiment of a cord cover angling around a corner. As is illustrated, the cord cover encases the electrical cord, protecting the wall corner from damage by the encased electrical cord.

Figure 3:
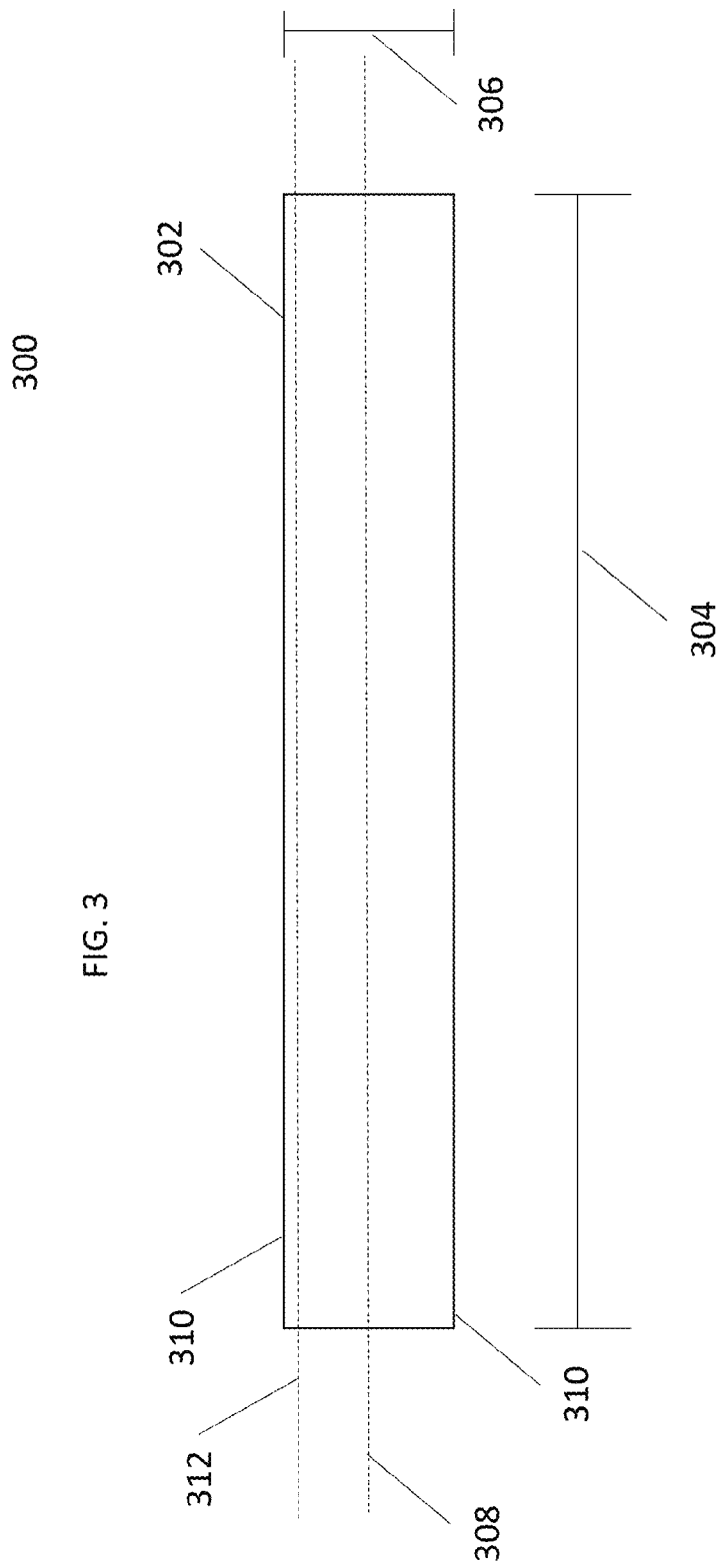
FIG. 3 is a schematic representation of an example electrical cord cover according to at least one embodiment of the present invention.

An exemplary manufacturing process will now be described with reference to FIG. 3, which is a schematic illustration of and exemplary cord cover. As a first step a long, soft, stretchy material such as cotton or other textile or fabric can be laid out and cut into a strip 302 having a length 304 and width 306. Dimensions are can be tailored to a particular application, such as a width 306 of 1.5 inches, 2 inches, or 3 inches and a length 304 sufficient to cover the electrical cord, or cords (as the case may be), which could be ten feet, thirty feet, fifty feet, or other appropriate dimension. The strip 302 can then be folded in half lengthwise along center line axis 308 such that its long edges 310 lie one on top of the other. Long edges 310 can then be stitched together along axis 312 which can be near the long edges 310. Stitching can be done in any manner known in stitching art such as with a sewing machine, by hand, or in another fashion but should be completed in a manner which provides sufficient strength such that the cord cover will be able to withstand normal usage conditions without the stitches pulling apart. Once long edges 310 are stitched together the cord cover can be turned inside out such that the stitching is on the interior of the apparatus. The cord cover can then be placed in its normal usage position when necessary. A first end of the cord cover can be placed over a free end of the electric cord. The cord cover can then be pulled along the length of the electric cord such that it covers the desired electric cord sufficiently to the user's requirements. The second end of the cord cover can then be positioned such that the electric cord slightly passes out the second end of the cord cover. For instance, this could allow an electrical plug to be plugged in.

Reinforcement of width edges or the addition of other components described herein can be done in a manner consistent with the end use of the device, such that it would not interfere with the normal usage of the device. For example, in some embodiments an adhesive can be applied to an inner surface near a first and second end of a cord cover such that the adhesive can hold the cord cover in place during normal operation. In other embodiments a constricting member such as a rubber band or elastic can be incorporated near the first and second end to secure the cord cover at each end to the electric cord when in use. In some embodiments a reinforcing lengthwise member can be inserted prior to or after the cord cover is put into position around the electric cord. In some embodiments circumferential components can be added at an appropriate step in order to maintain an interior space inside cord cover. In some instances a cord cover can be installed as a manufacturing step in the process of creating a device such as a vacuum where the cord cover could be installed along the electric cord prior to final attachment of the electric cord to the device. In many embodiments a cord cover is removable such that it can be washed if it becomes dirty through normal use and reinstalled when clean. Cord covers can be universal in nature such that they can be used with many different electric cords of different sizes and can also be custom created for particular electric cords which can have unique dimensions. This could happen in a case where an electric cord is extremely long or has a very large cross sectional diameter. Cross section of elongate members for use with the cord cover need not be circular, as triangular, square, rectangular, or other regular or irregular polygonal shapes can be used with cord covers.

Figure 4:
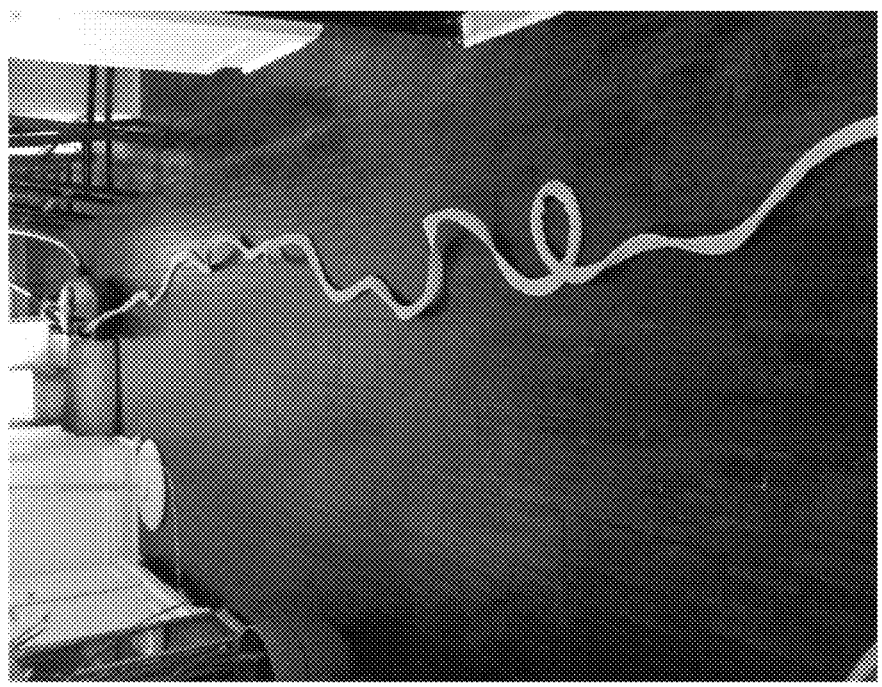
FIG. 4 shows an example electrical cord cover in use with an electrical cord according to at least one embodiment of the present invention.
Figure 5:
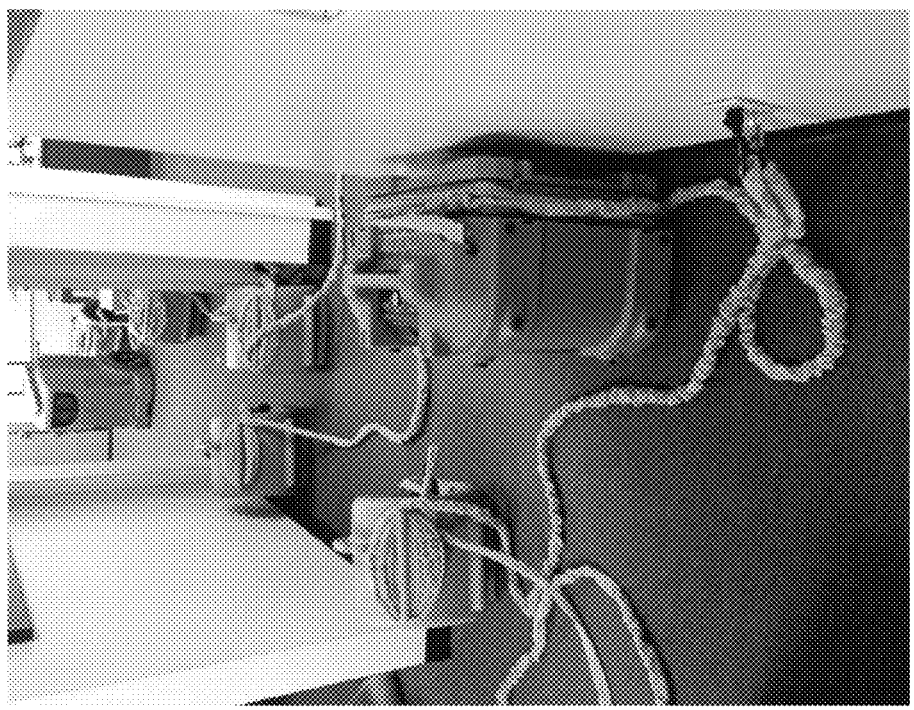
FIG. 5 shows several example electrical cord covers in use with electrical cords according to at least one embodiment of the present invention.

FIG. 4 shows an example embodiment of a cord cover surrounding a cord which is attached to a vacuum. FIG. 5 shows an example embodiment of several cord covers attached to different appliances such as dehumidifiers and carpet cleaners. As shown therein, in some embodiments, the cord cover is constructed of a contrasting material that provides a high level of contrast with dark surfaces, such as, for example, typical hardwood flooring. This high level of contrast with surrounding surfaces increases the visibility of the cord cover so as to reduce tripping or other accidents due to limited visibility of the cord/cord cover. In some embodiments, the contrasting material is colored and/or patterned to provide the desired contrast. Preferably, the colored material is fluorescent or 'hot' (for example, 'hot' pink, or 'hot' green). Still more preferably, the contrasting material will not increase the risk of damage to surrounding surfaces (e.g., walls, corners, furniture, etc.) via its coloring/pattern. It has been found that fluorescent green is an optimal coloring for reducing accidents as well as damage to surrounding surfaces.

The enablements described in detail above are considered novel over the prior art of record and are considered critical to the operation of at least one aspect of the invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that the named inventor believes that the claimed subject matter is what is intended to be patented.

What is claimed is:

1. An electrical cord covering, comprising:
    a monolithic, flexible tube having interior and exterior surfaces, wherein the exterior surface is colored to promote enhanced visibility to individuals nearby, thereby reducing risk of injury by tripping and wherein the exterior surface is a soft material such that it lessens or eliminates a risk of damage to objects and surfaces the electrical cord covering comes into contact with during use as compared to a risk of damage caused by use of a bare electrical cord;
    a proximal edge and an opposing distal edge joining the interior and exterior surfaces, each edge defining an opening and a length therebetween being otherwise uninterrupted;
    an interior space defined by the interior surface and operable to receive at least one frequently moved electrical cord at least partially therein such that the received cord is housed within a lumen of the flexible tube; and
    at least one structural support for promoting the traversal of the electrical cord within the flexible tube.

2. The electrical cord covering of claim 1, wherein the structural support is adjacent one or more of the interior and exterior surfaces.

3. The electrical cord covering of claim 1, wherein the structural support is a longitudinal structural support.

4. The electrical cord covering of claim 1, wherein the structural support is a circumferential structural support.

5. The electrical cord covering of claim 1, wherein the structural support is semi-rigid.

6. The electrical cord covering of claim 1, further comprising a location preserver adjacent one or more of the openings, for substantially maintaining the location of the associated edge with respect to the electrical cord.

7. The electrical cord covering of claim 1, wherein soft material is cotton.

8. The electrical cord covering of claim 1, wherein the exterior surface is colored fluorescent green.

9. The electrical cord covering of claim 1, wherein the exterior surface is colored fluorescent pink.

10. The electrical cord covering of claim 1, wherein the soft material is hemp.

11. A method for protecting surrounding surfaces from damage by an electrical cord, the method comprising:
    providing an electrical cord covering, the electrical cord covering comprising:
        a monolithic flexible tube having interior and exterior surfaces, wherein the exterior surface is colored to promote enhanced visibility to individuals nearby, thereby reducing risk of injury by tripping and wherein the exterior surface is a soft material;
        a proximal edge and an opposing distal edge joining the interior and exterior surfaces, each edge defining an opening and a length therebetween being otherwise uninterrupted;
        an interior space defined by the interior surface and operable to receive at least one frequently moved electrical cord at least partially therein such that the received cord is housed within a lumen of the flexible tube; and at least one structural support for promoting the traversal of the electrical cord within the flexible tube, wherein housing the electrical cord within the electrical cord covering, reduces or eliminates a risk of damage to surrounding surfaces the electrical cord covering comes into contact with during use as compared to a risk of damage caused by use of a bare electrical cord.

12. The method of claim 11, wherein the structural support is adjacent one or more of the interior and exterior surfaces.

13. The method of claim 11, wherein the structural support is a longitudinal structural support.

14. The method of claim 11, wherein the structural support is a circumferential structural support.

15. The method of claim 11, wherein the structural support is semi-rigid.

16. The method of claim 11, wherein the electrical cord covering further comprises a location preserver adjacent one or more of the openings, for substantially maintaining the location of the associated edge with respect to the electrical cord.

17. The method of claim 11, wherein the soft material is cotton.

18. The method of claim 11, wherein the exterior surface is fluorescent green.

19. The method of claim 11, wherein the exterior surface is colored fluorescent pink.

20. The method of claim 11, wherein the soft material is hemp.

\* \* \* \* \*